United States Patent [19]
Simpatico

[11] 3,797,683
[45] Mar. 19, 1974

[54] ROTARY EXTRACTOR METHOD AND APPARATUS

[75] Inventor: Anthony V. Simpatico, Palisades Park, N.J.

[73] Assignee: Avon Products, Inc., Suffern, N.Y.

[22] Filed: Apr. 10, 1972

[21] Appl. No.: 242,337

[52] U.S. Cl. .............. 214/301, 214/1 BC, 214/309, 214/1 Q
[51] Int. Cl. ............................................. B65g 65/02
[58] Field of Search ......... 214/301, 309, 152, 1 BC, 214/1 BD, 1 BH

[56] References Cited
UNITED STATES PATENTS

| | | | |
|---|---|---|---|
| 3,200,964 | 8/1965 | Eldred | 214/1 BC |
| 2,941,499 | 6/1960 | Gutzmer | 214/309 |
| 3,100,051 | 8/1963 | Schreiber | 214/1 BC |
| 3,043,447 | 7/1962 | Lauck et al. | 214/1 BC |
| 3,286,740 | 11/1966 | Fuchs, Jr. et al. | 214/301 |

Primary Examiner—Gerald M. Forlenza
Assistant Examiner—Lawrence J. Oresky
Attorney, Agent, or Firm—Pennie & Edmonds

[57] ABSTRACT

A rotary extractor including a continuously rotatable turret having a plurality of transfer units mounted thereon for movement about the rotational axis of the turret with each of the transfer units having an axis extending radially of the turret. Each transfer unit has a pair of cam operated jaws for synchronously gripping a formed pomade such as lipstick which is to be extracted from its mold. A second cam is provided for raising the transfer unit with respect to the turret after the jaws have grasped the pomade thereby separating the pomade from its mold. A third cam means is provided for rotating the jaws, and therefore the pomade, 180° after the transfer unit has been raised. Once the jaws have been rotated, the transfer unit is lowered by the second cam means and the jaws opened thereby positioning the extracted pomade on a transport for further processing.

4 Claims, 12 Drawing Figures

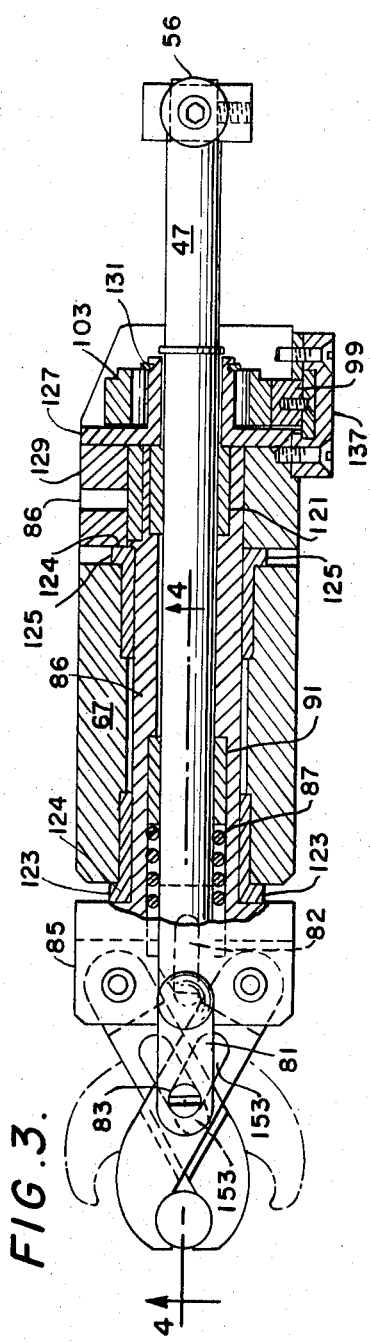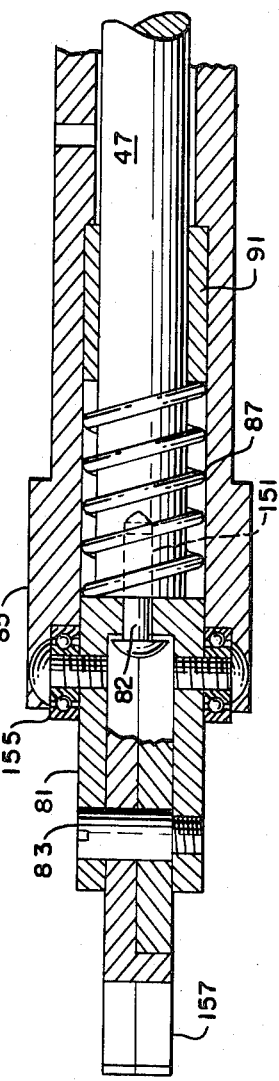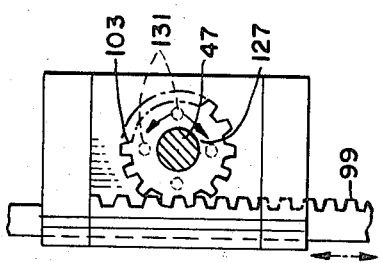

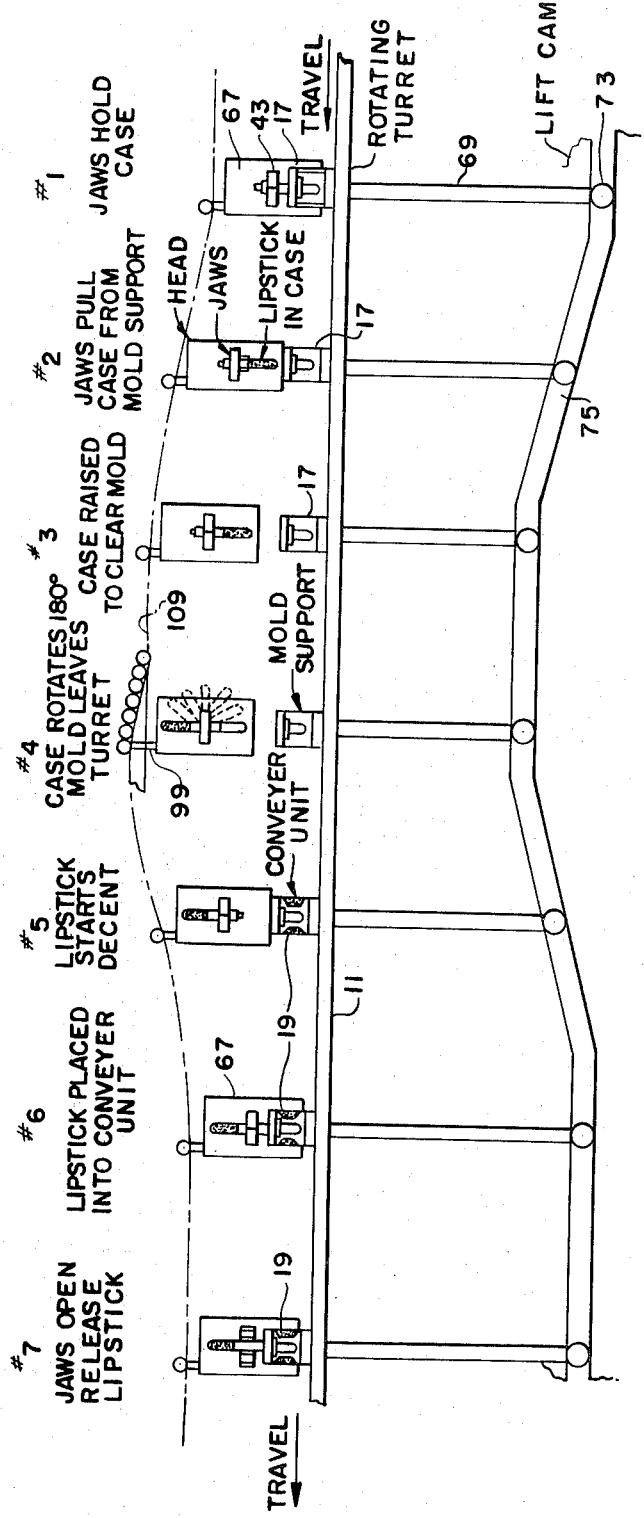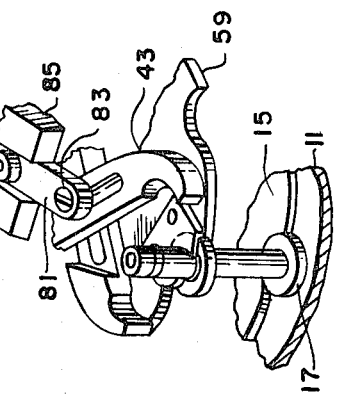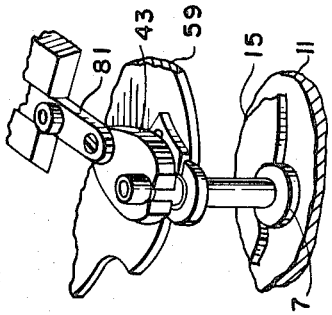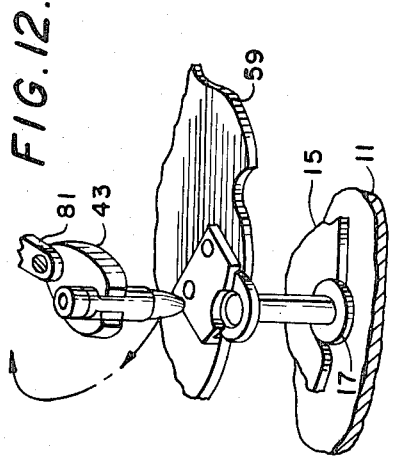

ROTARY EXTRACTOR METHOD AND APPARATUS

BACKGROUND OF THE INVENTION

This invention relates to an article handling method and apparatus for removing a moldable substance from a cast and for positioning the substance on a conveying belt for further processing. More specifically, but not limited thereto, this invention relates to a method and apparatus for extracting a formed pomade, such as lipstick, from its mold and for positioning the pomade on a transport means for further processing.

Fatty moldable substances such as pomades are presently being used in large quantities for both medicinal and cosmetic purposes. These substances are typically formed or shaped to a desired configuration and then packaged in a relatively small container for distribution to the public. If these substances, such as, for example, lipstick are to be produced economically, a method and apparatus therefore must be provided for rapidly extracting the formed pomade from its mold and then positioning the pomade and its container on a conveying means for further processing steps such as "flaming." At the same time, the empty molds must be recycled in order to increase the efficiency of the packaging system. In the past a number of methods have been devised for extracting these pomades from their respective molds. These inventions however, have included a number of steps requiring human labor and have, therefore, suffered from the usual deficiencies such as lack of speed and accuracy that are characteristic of human labor.

It therefore is an object of this invention to provide a method and apparatus for rapidly extracting a formable substance from its mold and for positioning the substance for further processing.

SHORT STATEMENT OF THE INVENTION

Accordingly, this invention relates to a rotary extractor for separating a formed pomade from a mold and then inverting and positioning the formed pomade on a transport means for further processing. The extractor includes a continuously rotating turret having a plurality of transfer units mounted thereon for movement with the turret about the axis thereof with each transfer unit having an axis extending radially of the turret. Each transfer unit has a pair of cam operated jaws for synchronously gripping the formed pomade at a given point in the rotational cycle of the turret. A second cam is provided for raising the transfer head with respect to the base of the turret thereby separating the formed pomade from its associated mold which mold is restrained from movement in the vertical direction. After the pomade and its container have been separated from the mold, a third cam means rotates the jaws, and hence the pomade, 180° about the radially directed axis of the transfer unit. The inverted pomade is then lowered by the second cam means onto a transport means after which the cam operated jaws are opened to release the pomade. The transfer head completes the cycle by rotating with the turret to receive another formed pomade and container therefor. At the same time the empty molds are transferred from the turret to a second transport means for recycling.

BRIEF DESCRIPTION OF THE DRAWINGS

Other objects, advantages, and features of this invention will be more fully apparent from the detailed description, the appended claims and the accompanying drawings in which:

FIG. 3 is a partial section view of transfer unit taken along the lines 3—3 of FIG. 2;

FIG. 4 is a section view of the jaw actuating mechanism of the transfer unit taken along the lines 4—4 of FIG. 3;

FIG. 5 is an end section view of the jaw rotating mechanism of the transfer unit taken along the lines 5—5 of FIG. 2;

FIG. 9 is a simplified schematic representation of the cam operated movement of the transfer unit and jaws thereof with rotation of the turret;

FIG. 10 is a perspective view of the open jaws of the transfer unit;

FIG. 11 is a perspective view of the closed jaws of the transfer unit when clamped about the pomade and container therefor; and FIG. 12 is a perspective view of the jaws of the transfer unit after the transfer unit is raised with respect to the turret table.

DETAILED DESCRIPTION OF THE PREFERRED EMBODIMENT

Figure 1:
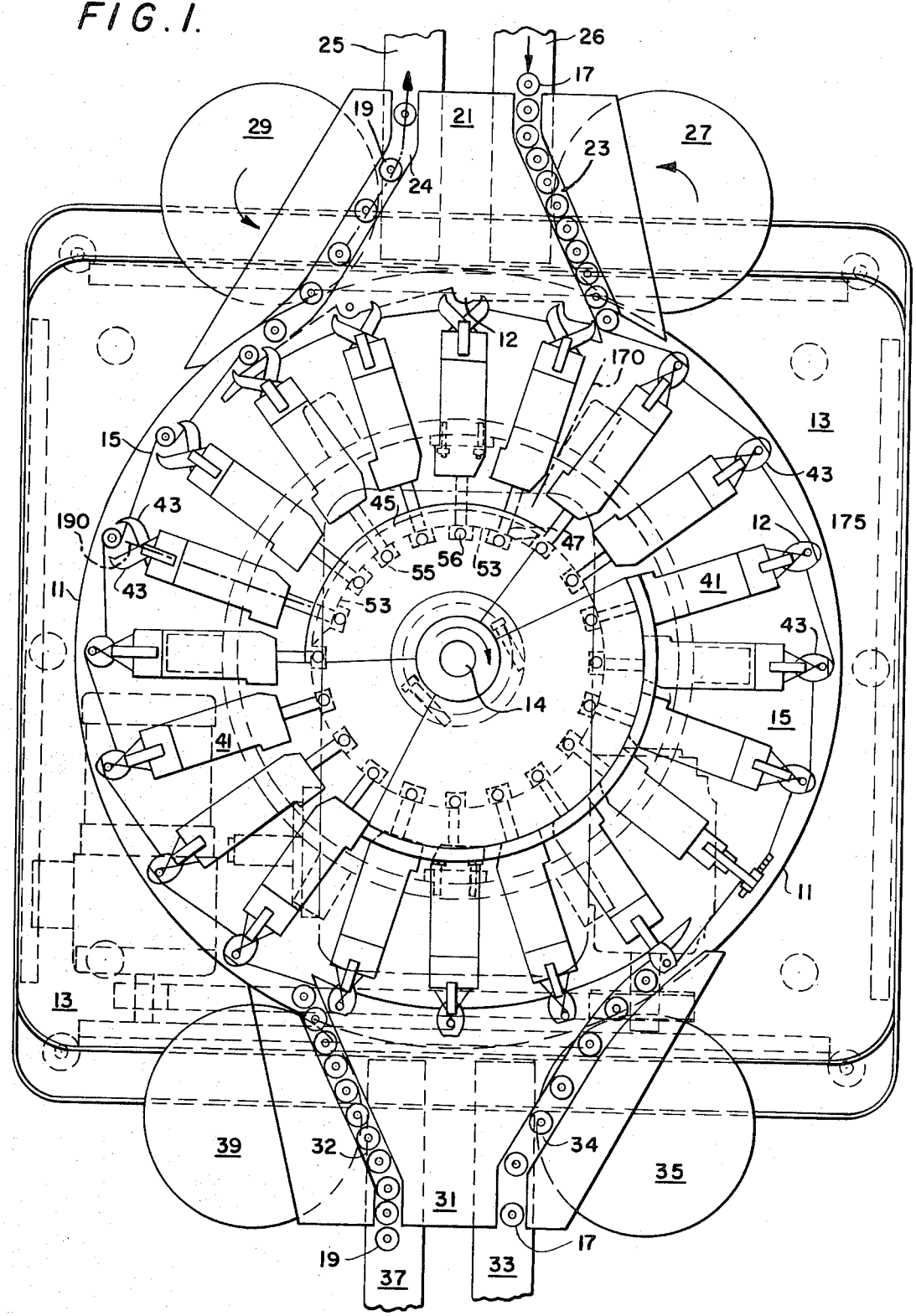
FIG. 1 is a plan view of the rotary extractor of this invention.
Figure 2:
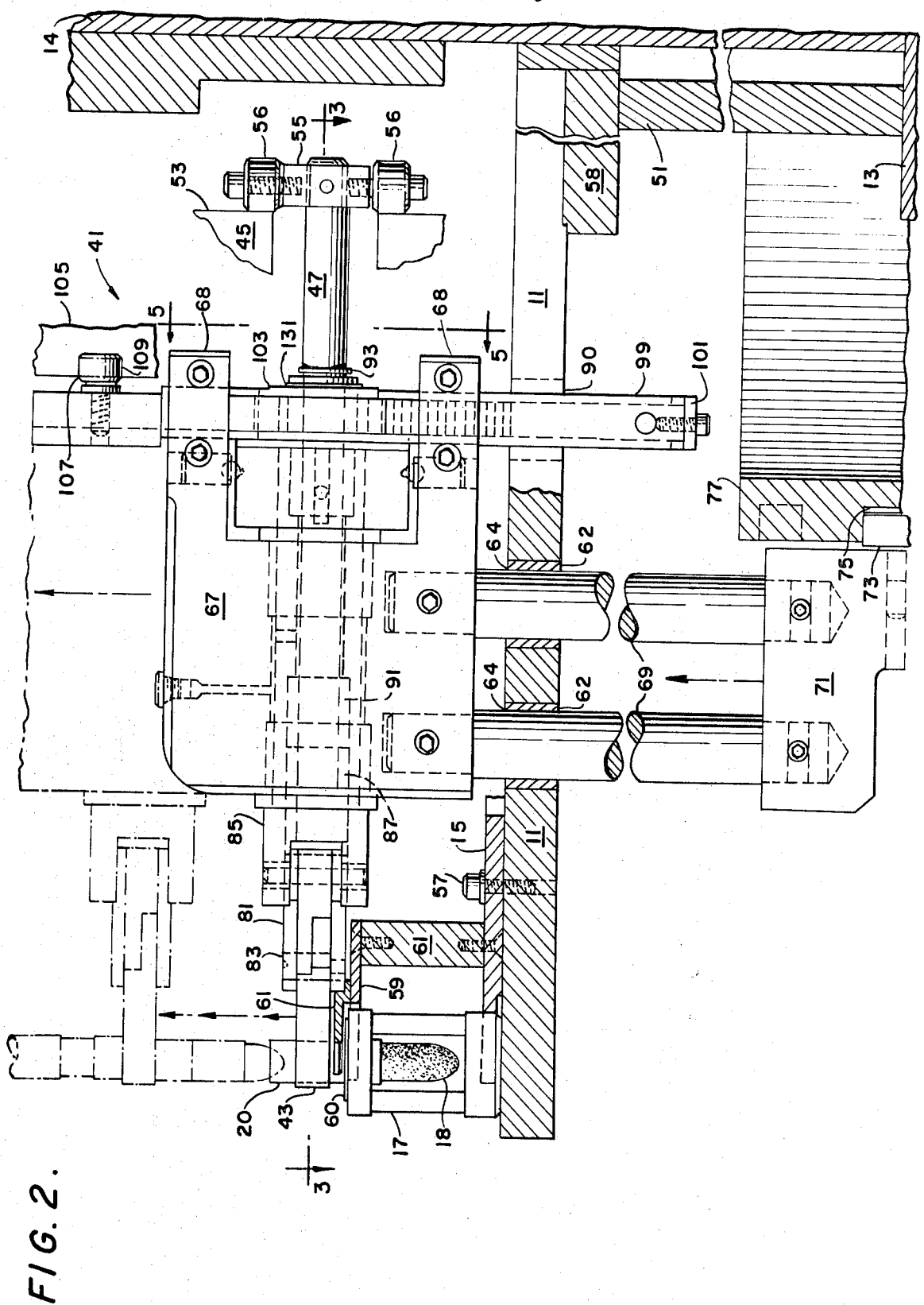
FIG. 2 is an elevation view of a transfer unit of the rotary extractor of this invention.

Referring now to FIG. 1 there is shown a plan view of the rotary extractor apparatus of this invention. A turret 11 is shown supported on a base 13 with the turret being rotatable with respect to the base 13 about a stationary shaft 14 having an axis that is perpendicular to the plan of the turret. Turret 11 is continuously rotated by a motor and drive gear arrangement (not shown). Fixidly mounted on turret 11 is a star wheel 15 having a plurality of arcuate edges 12 for receiving and positioning mold support units 17 and conveyer units 19. A mold support is shown in FIG. 2 and simply supports a mold 18 and pomade container 20 while the pomade is being poured into the mold. A conveying unit is similar to a mold support and simply supports the pomade and container therefor for further processing. A guide plate 21 forming two channels 23 and 24 directs the mold supports 17 onto the turret 11 from a conveyor belt 26 and directs conveyer units 19 away from turret 11 and onto a conveyor belt 25. A pair of transport plates 27 and 29 are shown for transporting the mold supports 17 from conveyer belt 26 to the turret 11 and for transporting conveying units 19 from the turret to conveyer belt 25, respectively. Positioned at the opposite end of the turret wheel is a second guide plate 31 which has a pair of channels formed therein for directing the mold supports 17 away from the turret and for directing onto the turret the conveying units 19. The mold supports are transferred from the turret to a conveying belt 33 by means of a transfer disc 35 and the conveying units 19 are transported from a conveyer belt 37 to the turret 11 by transfer disc 39. Each of the four transfer discs 27, 29, 35 and 39 may advantageously be driven via the same motor drive that rotates the turret.

A plurality of transfer units 41 are mounted on the turret 11 and are vertically moveable with respect thereto. In the preferred embodiment there are 20 such transfer units but it should be understood that any suitable number of such units could be mounted on the turret depending on the size of the extractor unit and the speed with which the formed pomade, such as, tubes of lipstick are to be extracted from their respective molds. Each of the transfer units has a pair of cooperating jaws 43 having an article gripping surface on corresponding portions thereof for clamping about the pomade or article to be handled. The jaws and consequently the articles being handled are rotatable about the axis of the transfer unit 41 which, as can be seen from the Figure, extends radially with respect to the turret and parallel to the plane thereof.

The jaws of the transfer units are closed after the mold supports 17 are positioned against the arcuate edge 12 of the star wheel 15 and are opened after conveying units 19 are appropriately positioned in the arcuate edge 12 of the star wheel. A cam 45 is fixidly attached to base 13 and provides a means for opening the jaws 43 of the transfer units 41. A shaft 4 is rotatably positioned in each transfer unit so that one end thereof cooperates with the jaws 43 for opening and closing the jaws as will be discussed more fully hereinbelow. A roller block 55 is secured to the other end of the shaft 47. A pair of cam followers in the form of rollers 56 are rotatably secured to the roller block and ride on the surface 53 of cam 45. The cam 45 is positioned so that surface 53 trails outwardly away from the axis of the turret at the angle that the mold support 17 becomes positioned in the arcuate edge 12 of the star wheel. Thus, at this angle (denoted by numeral 170 in FIG. 1) cam followers 56 ride outward radially on cam surface 53 and hence shaft 47 slides outwardly in the transfer unit 41 so that the jaws 43 can close about the pomade container being supported in the mold support 17. At the opposite end of the cam, the cam surface 53 extends inwardly at approximately the angle where the pomade and its container are positioned on the conveyer units 19. Thus at this angle (denoted by the numeral 190) the cam followers 56 ride inwardly on surface 53 and hence shaft 47 slides inwardly through the transfer unit so that the jaws 43 can open thereby releasing the pomade and its associated container.

Refer now to FIG. 2 which is a side elevation view of a transfer unit 41. The turret 11 is shown secured to axle shaft 14 of the extractor and is supported by a cylindrical support 51 to which is secured a disc shaped turret support 58. Fixidly attached to turret 11 is star wheel 15 which may be secured to the turret by any suitable means such as by a plurality of screws 57. A second star wheel 59 in the form of a ring having arcuate edges on the external periphery thereof and having the same dimensions as star wheel 15 is positioned above star wheel 15 with each arcuate edge thereof aligned with a corresponding arcuate edge of star wheel 15. Star wheel 59 is spaced from star wheel 15 by means of spacer support 61 which, in addition, rigidly secures star wheel 59 in place. A mold retaining plate 61 is fixidly attached to star wheel 59 and extends over the lip 60 of the mold 18 to prevent vertical movement of the mold 18 with respect to the turret 11. The retaining plate may be in the form of a ring extending circumferentially about the turret 11 or may preferably be in the form of a plurality of plates, each positioned on star wheel 59 at the locations of the arcuate edges in the star wheel. When the pomade and its container 20 are raised up and away from mold 18, the pomade may tend to stick to the mold thereby raising the mold up and away from the mold container 17. Retainer plate 61 prevents any such movement thereby insuring that the pomade is extracted from the mold.

A transfer unit housing 67 is shown being supported with respect to turret 11 by means of lift rods 69. The lift rods may be fixidly secured to the transfer head 67 by any suitable means and are secured at their other ends to a carriage 71. Carriage 71 has a cam follower in the form of a roller 73 rotatably attached thereto. The cam follower is positioned in a groove 75 in a cylindrical cam 77 which is rigidly positioned on the base plate 13. Cam 77 and hence groove 75 completely encircles shaft 14 and groove 75 has a variable vertical location as shown by the dotted lines. As the turret 11 rotates with respect to the base 13 and the cam 77, the roller 73 rides in the groove 75 thereby causing transfer unit 41 to move vertically with respect to turret 11, as shown by the phantom lines in the Figure. This vertical movement causes the pomade and its associated container to be lifted away from the mold. As the turret continues to rotate the groove eventually moves downwardly causing the transfer unit to return to its original vertical position. When this occurs the extracted container of pomade is positioned in a conveyer unit 19. Returning to the lift rods 69, a pair of bearings 62 are fitted in a pair of holes 64 in the turret. These bearings provide a minimum friction surface through which the lift rods slide as carriage 71 and cam follower 73 rise and fall in accordance with the path defined by slot 75.

Transfer housing 67 has a horizontal channel through the longitudinal axis thereof for slideably and rotatably supporting a jaw shaft 47. Jaw shaft 47 is terminated at one end in a yoke 81 which is secured to the shaft by any suitable means such as, for example, a screw 82 which is shown in FIGS. 3 and 4. Yoke 81 has a pivot pin 83 inserted therethrough which also passes through aligned holes in the complementary jaws 43. Each jaw is rotatably secured to a jaw mount 85 which is immovable with respect to the longitudinal axis of the transfer head 67. The shaft 47 is biased to the left by means of a compression spring 87 which abuts at one end against yoke 81 and at the other end against a bearing 91 which bearing facilitates the linear movement of shaft 47 with respect to the jaw mount 85. A retaining ring 93 is provided which is fixidly attached to the shaft 47 to prevent movement of the shaft to the left beyond a given point.

A roller block 55 is secured to the opposite end of shaft 47. Rotatably attached to the roller block 55 is a pair of cam followers 56 which follow the surface 53 of cam 45. As the cam surface 53 forces rollers 56 to the right, shaft 47 is pulled to the right against the bias of spring 87 thereby causing jaws 43 to open and conversely as cam surface 53 permits rollers 56 to move to the left, shaft 47 moves to the left under the bias of spring 87 thereby closing jaws 43. The cooperating action of the jaws will be more fully explained in connection with FIG. 3.

A rack 99 having a bottom stop 101 is slideably mounted in the yoke portion 68 of the transfer housing 67 and cooperates with a one-way clutch 131 such as a drawn roller cup clutch to rotate shaft 47 via a pinion 103. The clutch couples the rotational movement of the pinion 103 imparted thereto by the rack 99 to a rotational movement of shaft 47 only when rack 99 is being raised with respect to turret 11. A hole 90 is provided in turret 11 through which rack 99 can move in the vertical direction. The vertical movement of rack 99 is effected by means of a cam 105 having a slot 109 therein in which rides a cam follower 107 which is rotatably attached to the rack 99. The cam 105 extends circumferentially about the axle 14 in the same manner as lift cam 77 and the groove or slot 109 therein changes its vertical position about the circumference of the cam in order to effect vertical movement of rack 99. As the vertical elevation of the path of the slot 109 changes, the cam follower 107 riding in slot 109 moves rack 99 upward and downward with respect to turret 11. This movement is converted to a rotary movement of shaft 47 via clutch 131 when rack 99 is raised. When the rack is lowered, the one-way clutch 131 does not couples torque to the shaft 47 and hence there is no reverse rotational movement of the shaft. When shaft 47 rotates, jaw mount 85 which rotates therewith causes jaw 43 to rotate thereby rotating the article being handled. This movement, because of the configuration of the cam slot 109, is limited to 180° of rotation and hence the pomade and its container are inverted.

Refer now to FIG. 3 which is a cross sectional view of the transfer head taken along the lines 3—3 of FIG. 2. Shaft 47 is shown positioned within the transfer head housing 67 with bearings 91 and 121 providing a relatively frictionless interface between the cylindrical portion 86 of the jaw mount 85 and the shaft 47 so that the shaft 47 can move longitudinally with respect to jaw mount 85. Another set of bearings 123 and 125 are disposed between the jaw mount 85 and the housing 67 to permit rotational movement of the jaw mount within housing 67 about the longitudinal axis of the transfer unit. These bearings each have a rim portion 124 extending into engagement with the housing 67 to prevent longitudinal movement of the jaw mount. A clutch flange 127 is secured to a locating hub 129 which is fixidly secured to jaw mount 85 by means of a set screw 86. The hub is rotatable along with mount 85 with respect to housing 67. A one-way clutch 131 is mounted over clutch flange 127 and is secured in position by means of a retaining ring 133 which is positioned in a groove that extends about the outer periphery of the clutch flange. The one-way clutch may be of any suitable type known in the art, however, in the preferred embodiment the clutch is a drawn roller cup which overruns, backstops, and indexes. A drive gear or pinion 103 is positioned over the one-way clutch 131. The clutch couples rotation motion to shaft 47 and jaw mount 85 via clutch flange 127 when pinion 103 is rotated in a first direction and, as aforementioned, does not couples any rotational energy to the shaft when the pinion 103 rotates in the opposite direction. The rack 99 is positioned as shown with its teeth meshing with the teeth of the pinion 103 as the rack moves up and down within the gear rack mount 137.

At the opposite end of shaft 47 there is shown the yoke 81 secured to the shaft by means of a screw bolt 82. The co-operating jaws 43 are rotatably secured to jaw mount 85 at one end thereof and are joined by a pivot pin 83 approximately midway to the other end. Each jaw has an elongated hole 153 therethrough for permitting the pivot pin 83 to slide therein as shaft 47 moves linearly with respect to the jaw mount. As shown, the shaft 47 is normally biased to the left by spring 87. The pivot pin 83 acting against the sides of the elongated holes 153 in the jaws forces the jaws to a closed, gripping position about the pomade container (not shown). When, however, shaft 47 is forced to the right by the action of cam 45 acting on rollers 56, the pivot pin acts against the sides of the elongated holes 153 to open the jaws to the position shown in phantom.

Refer now to FIG. 4 which shows a cross sectional view of the jaw mount and jaw assembly taken along the lines 4—4 of FIG. 3. Jaw mount 85 is shown having shaft 47 mounted therethrough with the shaft being movable with respect to the mount. Bearings 91 minimize the friction experienced by the shaft as it slides in the jaw mount. A yoke 81 is shown being rigidly secured to the end of shaft 47 by a screw inserted through a hole in the yoke and into an internally threaded portion 151 of the shaft. The yoke defines movement of the jaws by means of a pivot pin 83 mounted through concentric holes in the yoke and the elongated slots 153 of the jaws. The other ends of the jaw are secured to the jaw mount 85 by means of a pair of screws inserted through holes in the jaw mount and threaded into the jaws. A bearing arrangement 155 is provided to facilitate relative rotational movement of the jaws 43 with respect to the jaw mount. Each jaw has a complementary article clamping or gripping portion 157 as shown. Normally, as aforementioned, the yoke 81 and consequently the shaft 47 are biased to the left with respect to the jaw mount 85 by means of a compression spring 87 in which condition the jaws are closed. When shaft 47 is pulled to the right against the bias of spring 87, pivot pin 83 slides inwardly with respect to jaw mount 85 thereby forcing the jaws open due to the action of the pivot pin against the sides of the jaw slots 153.

Refer now to FIG. 5 which shows an end view of the rack and pinion arrangement for rotating shaft 47 and jaw mount 85 with respect to the transfer head. Shaft 47 is shown having a clutch flange 127 secured thereto. A one-way clutch arrangement 131 interfaces the flange 127 and a pinion gear 103 which is positioned over the one-way clutch 131. A gear rack 99 is positioned tangentially with respect to the pinion with the teeth of the rack meshing with the teeth of the pinion. When the gear rack moves upwardly, the linear motion thereof is translated into rotational motion by the pinion which motion is coupled to the shaft 47 by means of the one-way clutch 131. When the rack moves downwardly, the pinion rotates in a counter-clockwise direction but motion is not coupled to the shaft 47 because the one-way clutch 131 only couples motion to the shaft when pinion 135 rotates in a clockwise direction.

Figure 8:
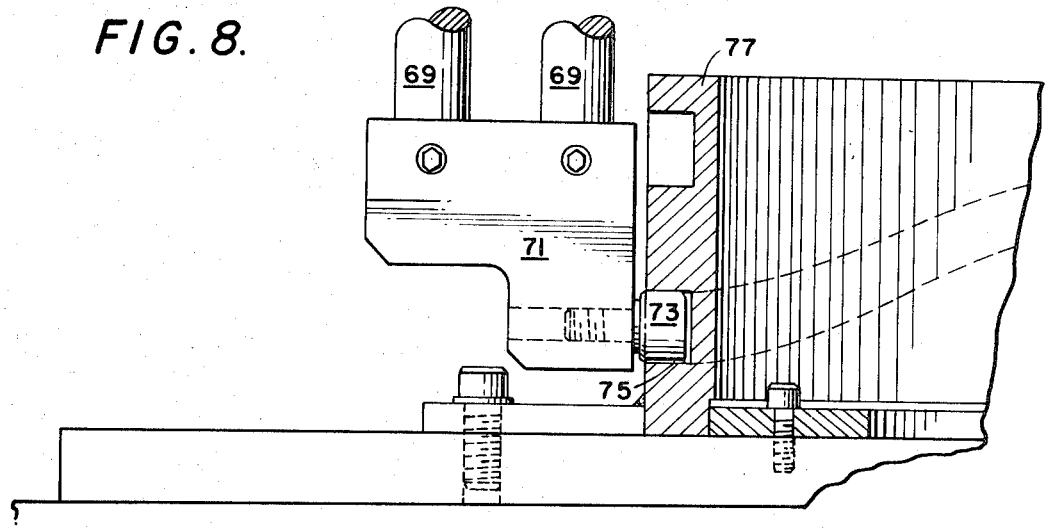
FIG. 8 is a section view of the transfer unit lift mechanism.

Refer now to FIG. 8 which shows a more detailed illustration of the cam operation for lifting the transfer unit 41 with respect to the turret 11. Cam 77 is shown having a groove 75 which extends circumferentially about the extractor axis 14 and which has a variable vertical location. The carriage unit 71 supports lift rods 69 which in turn support the transfer unit. Cam follower 73 is rotatably attached to carriage 71 and is positioned in the cam groove 75. As carriage 71 moves with the turret about the base of the extractor, the cam follower moves in the cam groove 75 thereby raising and lowering the carriage and lift rods with respect to the base plate 13. The groove 75 is designed so that the carriage is not raised until the jaws have grasped the pomade container and is not lowered until the pomade container is positioned over a conveyer element 19.

Referring now to FIG. 9, there is shown a schematic linear layout of the movement of the transfer head 67 and jaws 43 as the turret completes movement through a 360° angle. Moving from right to left as indicated by the arrow, the jaws are initially closed about the pomade container. At position 2, the lift cam 75 is inclined upwardly thereby forcing the transfer head 67 in a vertical direction via lift rods 69. The pomade and container therefor are thereby raised causing the pomade to be extracted from the mold which is positioned in the mold container. At station 3 the transfer unit 41 is raised even further in a vertical direction thereby clearing the pomade and its container from the mold. Note that the cam groove 109 is also inclined at the same angle as the lift cam 75 so that no rotation of the jaws can be effected during this initial extraction process. At station 4, cam 109 is inclined upwardly causing rack 99 to rotate pinion gear 103 thereby rotating the jaws 43 and the pomade 180°. At station 5 with the pomade and its container having been inverted, cam 75 slopes downwardly thereby permitting the transfer head to move downward with respect to the turret. At station 6 the pomade and its container are placed on a conveying unit 19 as the transfer head 67 is further lowered toward the turret. Finally, at station 7 the jaws are opened under the control of cam 45, shown in FIG. 1, thereby permitting the pomade and its container to be conveyed on transport means 25 for further processing.

Figure 6:
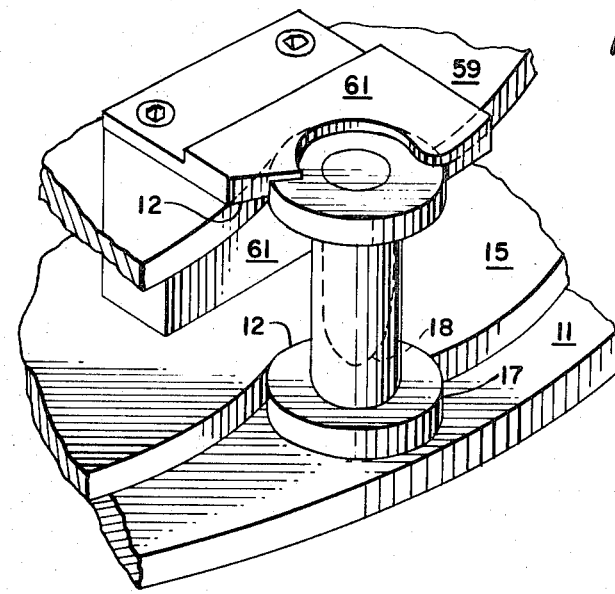
FIG. 6 is a partial perspective view of the turret table showing the position of the mold container with respect thereto.
Figure 7:
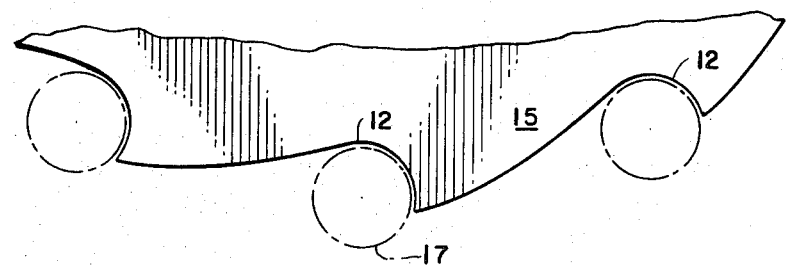
FIG. 7 is a plan view of the star wheel configuration of the turret.

FIGS. 6 and 7 show how the mold support 17 is positioned on the turret 11. A star wheel 15 is mounted on the turret 11 and has, as shown, an arcuate edge 12 for receiving the circular outside periphery of the mold container. In order to prevent tipping of the mold container, a second annular star wheel 59 is mounted above the star wheel 15 by means of a plurality of star wheel supports 61. This star wheel also has an arcuate edge 12 for receiving the upper external portion of the mold container as shown. A retaining plate 61 is mounted on the star wheel 59 at each arcuate edge of the star wheel 59 to restrain vertical movement of the mold. As shown in FIG. 7, the arcuate edge of the star wheel has a radius that is slightly greater than that of the mold support thereby permitting some movement of the container 17 when contacted by the star wheel so that when the jaws clamp about the pomade container, the container is not tilted with respect to the mold as would happen if the mold support was not free to move in the pocket formed by the star wheel. In the preferred embodiment the working radius of the edge 12 is 0.77 inches while that of the mold support is only 0.75 inches. However, it should be understood that any suitable dimensions can be utilized but that it is important that the working radius of the star wheel's arcuate edges be greater than the radius of the mold container.

FIGS. 10-12 show how the jaws cooperate to grasp and raise the pomade container. In FIG. 10, the mold container 17 is positioned with respect to the turret by the star wheels 15 and 59 with the jaws 43 in the open position as shown. In FIG. 11 yoke 81 has moved outwardly from jaw mount 85 thereby causing the jaw 43 to close with the complementary article grasping portions thereof clamping about the pomade container 20. As shown in FIG. 12, the jaws have been raised as previously illustrated at station 2 of FIG. 9, and the pomade container with the formed pomade is extracted from the mold 20 and mold support 17. Retaining plate 61 prohibits vertical movement of either the mold support 17 or the mold 20.

Referring back to FIG. 1, the mold supports 17 with the formed pomade enter the extractor via channel 23 in guide plate 21. The pomade and its container are grasped by jaws 43 and raised away from the mold container 17. At angular position 180, the pomade and its container are inverted and then positioned over conveying units 19 which enter the extractor via channel 32 of guide plate 31. In the meantime, the mold supports with the empty molds are transported away from the extractor via channel 34 in guide plate 31 for recycling. After the pomade and container therefor are positioned over a conveying unit 19 they are lowered onto the unit and the jaws 43 are opened as shown at position 190. The inverted pomade is then transported away from the extractor via channel 24 of guide plate 21 for further processing.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

I claim:

1. An apparatus for extracting a formed pomade from a mold and for positioning the extracted pomade for further processing, said pomade being at least partially in a container and said mold being carried by a mold support, said apparatus comprising a base, a turret, means for rotating said turret at a substantially constant speed with respect to said base, at least one transfer unit mounted on said turret for movement about the axis of said turret, said transfer unit having a principal axis extending radially of said turret axis, a pair of jaw members having complementary pomade container gripping surfaces in corresponding portions thereof, said jaw members carried by said transfer unit and rotatable about said axis of said transfer unit, means for positioning said mold support proximate said jaw members, means for closing said jaws about said pomade container after said mold support is positioned and for opening said jaws after said pomade and container has been extracted from said mold and positioned, said means for opening and closing said jaws including a first cam fixedly positioned with respect to said base, a shaft extending through said transfer unit, at least one cam follower rotatably attached to one end of said shaft, said cam follower riding over said cam as said turret rotates with respect to said base thereby moving said shaft in first and second directions in accordance with the profile of said cam, and means attached to the other end of said shaft for opening said jaws when said shaft is moved in a first direction and for closing said jaws when said shaft moves in a second direction, means for raising said transfer unit with respect to said turret after said jaws have been closed about said pomade container and for restraining movement of said mold when said pomade and container therefor is extracted therefrom, said means for raising said transfer unit including a second cam fixedly positioned with respect to said base, means for supporting said transfer unit with respect to said turret, at least one cam follower attached to said support means, said cam follower riding on said second cam as said turret rotates with respect to said base thereby moving said transfer unit in the vertical direction in accordance with the profile of said second cam surface, said pomade container being extracted from said mold upon vertical upward movement, means for rotating said jaws substantially 180° about said axis of said transfer unit, said means for rotating said jaws 180° including a third cam means fixedly positioned with respect to said base, a rack, a cam follower attached to said rack for moving said rack back and forth in accordance with the profile of the surface of said third cam, and means associated with said shaft for converting the motion of said rack to a rotary movement of said shaft when said rack moves in a first direction, said pomade and pomade container being thereby inverted, said means for raising said transfer unit also providing for lowering said transfer unit after said pomade and container therefor had been inverted in order that said pomade and container therefor are positioned on a conveying means for transporting the same away from said apparatus, and means for conveying said empty mold and said mold support away from said extractor apparatus.

2. The apparatus of claim 1 wherein said means for converting the motion of said rack to the rotary motion of said shaft comprises a pinion for converting the motion of said rack to rotary motion and a one-way clutch positioned between said pinion and said shaft for imparting the rotary motion of said pinion to said shaft when said pinion rotates in a first direction and for isolating the rotary motion of said pinion from said shaft when said pinion rotates in a second direction.

3. The apparatus of claim 2 wherein said means for positioning said mold support proximate said jaws includes a star wheel having an arcuate mold support receiving edge for each transfer unit on said turret, each arcuate edge having a slightly greater working radius than the radius of said mold support, and means for transporting said mold support into the area defined by said arcuate edge.

4. The apparatus of claim 3 wherein said means for transporting said mold support comprises a guide plate for directing said mold support onto said turret and into said area defined by said arcuate edge of said star wheel, and conveyer means for passing said mold support through said guide plate onto said turret.

* * * * *